UNITED STATES PATENT OFFICE.

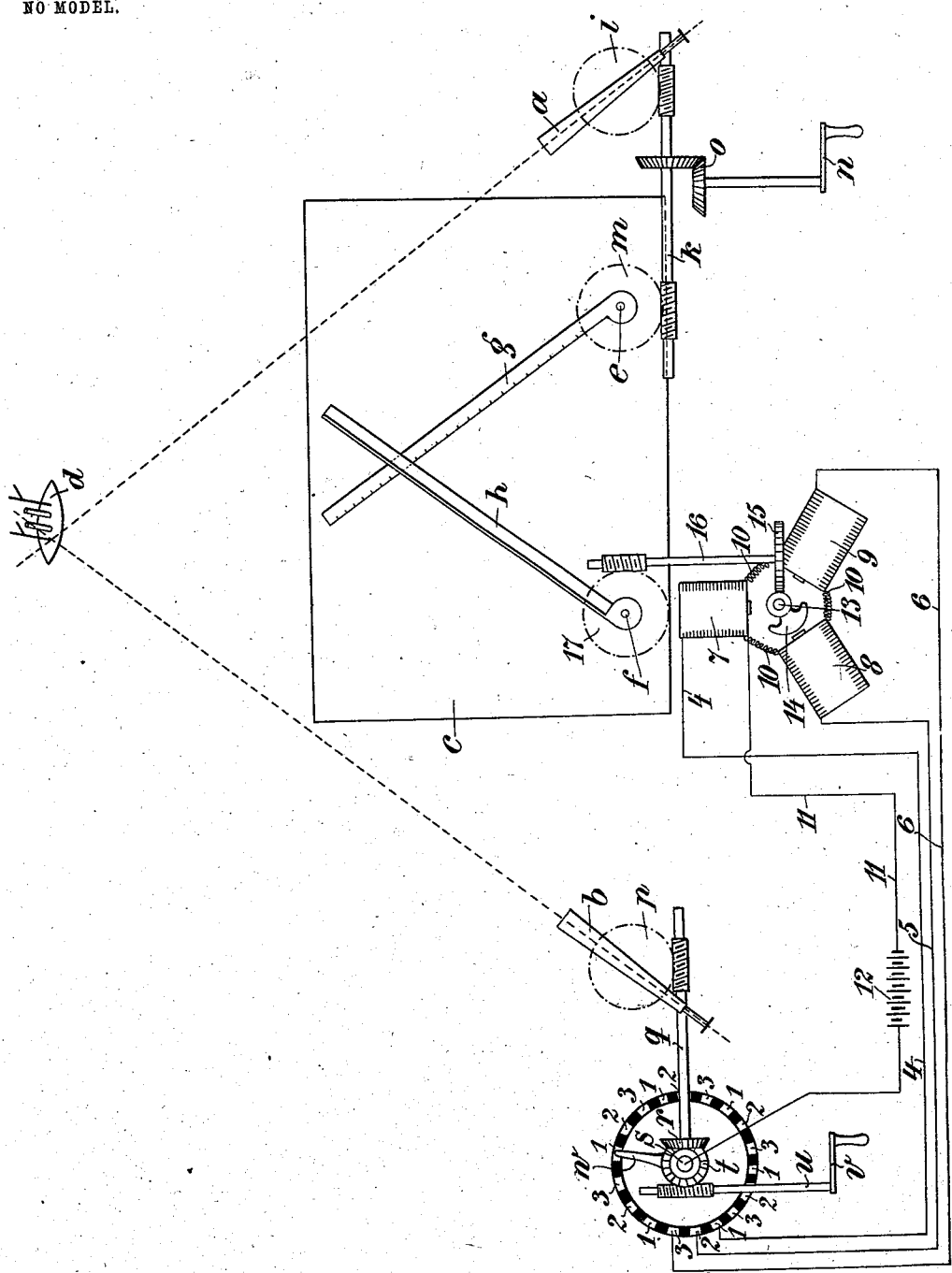

JOHAN POUL SÖRENSEN, OF COPENHAGEN, DENMARK.

DISTANCE-METER OR RANGE-FINDER.

SPECIFICATION forming part of Letters Patent No. 722,435, dated March 10, 1903.

Application filed August 30, 1902. Serial No. 121,680. (No model.)

*To all whom it may concern:*

Be it known that I, JOHAN POUL SÖRENSEN, telegraphic assistant, of Nordborggade 11, Copenhagen, in the Kingdom of Denmark, have invented certain new and useful Improvements in Distance-Meters or Range-Finders; and I do hereby declare the following to be a full, clear, and exact description of the invention, such as will enable others skilled in the art to which it appertains to make and use the same, reference being had to the accompanying drawing, and to letters and figures of reference marked thereon, which forms a part of this specification.

The present invention relates to a distance-meter or range-finder.

The arrangement of causing an armature to swing through a definite distance on a pivot by carrying an arm over one or several contacts suitably connected with electromagnets interposed in an electric circuit, which magnets are arranged in a circle around the said pivot, is known. So is also the method of adjusting a pivoted straight-edge rotating on the plane of a map parallel to the axis of a telescope, which is directed to a spot of country which corresponds to the position of the pivot on the map. The present invention is a combination of these two known arrangements, the telescope being directed to the telescopic station by means of the contact-arm mentioned above, while the straight-edge or other indicator is rotated on the plane of the map by means of the armature connected to its pivot. In this way the straight-edge is made to follow the movements of the telescope automatically when the latter is rotated, which does not occur when the method already referred to is made use of, for in this known arrangement the proper position of the straight-edge is found by moving the latter to and fro until a galvanometer inserted in a Wheatstone bridge takes up a definite position.

The arrangement is shown diagrammatically in the drawing, being so arranged that the map, with the two straight-edges or indicators, is placed in the immediate neighborhood of one of the measuring-telescopes at the latter's station.

The telescopes $a$ $b$ are pivoted on vertical axes. To these correspond upon the map two axes $e f$, around which the two straight-edges $g h$ can rotate. The vertical axis of the telescope $a$ is provided with a worm-wheel $i$, with which engages a worm $k$, which is also in engagement with a second worm-wheel $m$, having the same number of teeth as the first one $i$. The worm $k$ is turned by means of a crank $n$ and two bevel-wheels $o$. When the crank $k$ is turned, both the telescope $a$ and the straight-edge $g$ are also turned, so that these two members perform angular movements of precisely the same amount. If the map $c$ be properly oriented, the edge of the straight-edge or indicator $g$ and the axis of the telescope $a$ remain parallel during this angular movement, and if the telescope be directed upon a vertical line at the goal $d e g$ upon a mast° the edge of the straight-edge upon the map gives the direction of the object with reference to the line which joins the points $e f$. The telescope $b$ at the other station carries a worm-wheel $p$, which engages with a worm $q$, upon the axis of which is a bevel-wheel $r$. This wheel $r$ engages with a second bevel-wheel $t$, which is fixed on an axis driven by means of a worm $u$ and a crank $v$. The axis further carries a contact-spring or an arm $w$, which when the axis $s$ is turned slides over a row of contact-buttons which are placed in a circle concentric with the said axis. Eighteen such contact-buttons are shown in the drawing, and these are numbered successively 1 2 3, 1 2 3, and so on, all the buttons bearing the same figure forming a group, since they are mutually connected, but are insulated from the buttons bearing other figures. From each of the groups 1 2 3 pass wires 4 5 6, these wires being led to the station at which the map $c$ is placed and are there connected to the coils of three electromagnets 7 8 9, whose axes are placed in the same plane and are so arranged that the axis of each magnet forms, with those of the other two, an angle of one hundred and twenty degrees. The other ends of the three coils are connected together by wires and by means of a conductor 11, in which is interposed a suitable source of current with the arm $w$. At the point of intersection of the axes of the three electromagnets 7 8 9 is placed an axis 13, which carries the plate 14, which is approximately of the form of the flukes of a ship's anchor, its angles lying somewhat nearer the axis 13 than the middle of its curve, while the length of the plate is so great that the two angles project into the magnetic fields of the two other electromagnets when the center of the curve of the plate is opposite one of their number.

The armature or the plate 14 carries a worm which engages with a worm-wheel 15, secured on the axle of a worm 16. The worm 16 engages with a worm-wheel 17 on the pivot *f* of the straight-edge or indicator *h*.

When the telescope *b* is turned by turning the crank *v*, the arm *w* is at the same time made to pass over the contact-buttons. Every time the arm touches a contact-button a current passes through the arm *w*, the contact-button—*e. g.*, that marked 1—the line-wire 4, the electromagnet 7, the line-wire 11, and the battery 12. The armature-plate 14 is then attracted by the electromagnet 7, so that the middle of its curve comes to lie in the produced axis of the electromagnet. By the rotation of the armature-plate 14 the worm, which is in fixed connection with it the worm-wheel 15, the worm on the axis 16, and the straight-edge *h* are also made to rotate.

The number of the contact-buttons depends upon the exactitude which is desired in the observations; but if three electromagnets be used the number of buttons must be divisible by the number three. If in the present case eighteen contact-buttons are used and the wheel *p* is provided with one hundred and twenty teeth and the wheels *r t* and 15 with eighteen teeth and the wheel 17 with forty teeth, the straight-edge *h* will be caused to execute the same angular movement as the telescope *b*, and the straight-edge will be moved by a motion of the telescope which corresponds to not less than five minutes of arc.

Supposing the map *c* to be properly oriented, if the straight-edge or indicator *h* be once for all set parallel to the axis of the telescope *b*, then it will always remain parallel to the axis of the telescope when the latter rotates, and the point of intersection of the edges of the two scales *g h* will consequently indicate upon the map the position of those lines vertical to the object which are cut by the axes of the two telescopes or in which the vertical planes of these axes intersect.

One or both of the straight-edges or indicators *g h* may be marked with a scale, with the points *e f* as zero-points, in such a way as to allow the distance of the object from the stations *a* and *b* to be directly read off. The map may also be divided into degrees or in some similar way, so as to give at once the azimuth of the object.

If the map be not in the immediate neighborhood of the telescope *a*, it must be connected with the straight-edge *g* by means of an arrangement similar to that by which the telescope *b* is connected with the straight-edge *h*.

If the map be not oriented, then at the outset there must be given to both the straight-edges a direction with reference to the line *e f* corresponding to that which the axes of the telescopes *a* and *b* occupy with reference to the base *a b*.

Having now particularly described and ascertained the nature of my said invention and in what manner the same is to be performed, I declare that what I claim is—

1. In a range-finder, the combination with an indicator and means to move it, of a second indicator, a plurality of electromagnets, an armature revoluble through the fields of said magnets and arranged to operate said second indicator, a plurality of contacts, each electrically connected to a magnet and means to send current to energize the magnets to rotate the armature and second indicator, substantially as described.

2. In a range-finder, the combination with an indicator and means to move it, of a second indicator, a plurality of electromagnets, an armature revoluble through the fields of said magnets and arranged to operate said indicator, a plurality of contacts arranged in groups, each group electrically connected to a magnet and means to send current to energize the magnets to rotate the armature, substantially as described.

3. In a range-finder, a telescope, contacts, electromagnets electrically connected to said contacts, an armature revoluble in the fields of said magnets, an indicator positioned by said armature, and means positioned relatively to the azimuth direction of the telescope to send current through a contact to a magnet to rotate the armature and correspondingly position the indicator, substantially as described.

4. In a range-finder, a telescope, circularly-arranged contacts electrically connected in groups, an electromagnet electrically connected to each group of contacts, an armature revoluble in the fields of all the magnets, an indicator revolved by said armature, and means to position said telescope and simultaneously send current through a correspondingly-situated contact to energize a magnet, rotate the armature and the indicator to a position substantially parallel with the telescope, for the purpose set forth.

5. In a range-finder, an indicator, a plurality of electromagnets, an armature revoluble in their fields and arranged to rotate the indicator, and means at a distant point to selectively energize the magnets to rotate the armature and indicator, substantially as described.

6. In a range-finder, an indicator, a plurality of electromagnets, a lunette-shaped armature, the horns thereof sufficiently long to project into the fields of adjacent magnets when the armature is opposite one of them and arranged to rotate the indicator, means at a distant point to selectively energize the magnets to rotate the armature and indicator, substantially as described.

7. In a range-finder, a straight-edge, a plurality of electromagnets, an armature revoluble in the field of said magnets, a worm on the armature, a worm-wheel gearing therewith, a shaft rotated by the worm-wheel, a worm on the shaft and a worm-wheel on the straight-edge gearing with the worm, a series of circularly-arranged contacts electrically connected in groups, each group electrically connected to an electromagnet, a trailing contact-arm movable over the contacts, means to move said arm, a telescope, and means to move the telescope correspondingly with the arm, substantially as described.

In testimony that I claim the foregoing as my invention I have signed my name in presence of two subscribing witnesses.

JOHAN POUL SÓRENSEN.

Witnesses:
B. JACOBSON,
ERNEST BOUTARD.